United States Patent Office 3,338,269
Patented Aug. 29, 1967

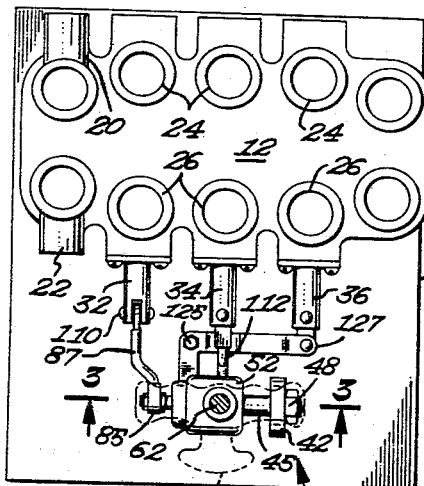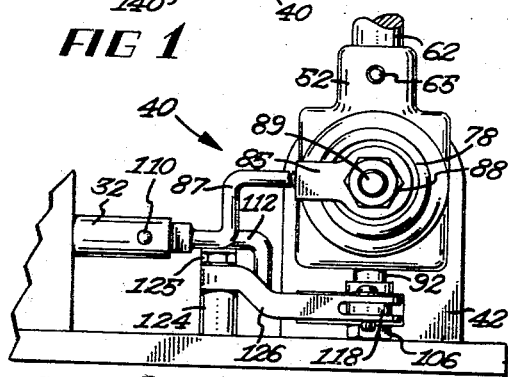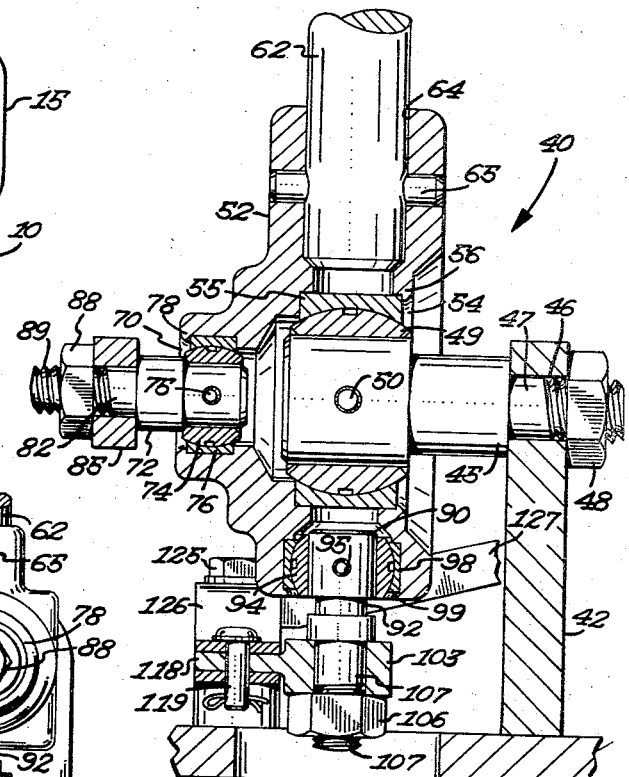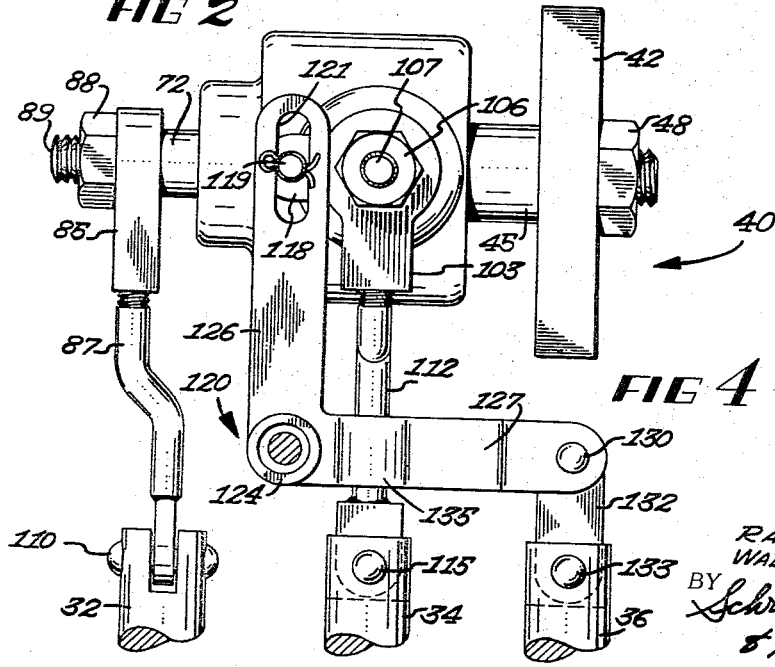

3,338,269
CONTROL MECHANISM
Ralph E. Carbert, Minneapolis, Minn., and Wade A. Eskridge, Kansas City, Mo., assignors to Tel-E-Lect Products, Inc., a corporation of Minnesota
Filed Nov. 25, 1964, Ser. No. 413,776
12 Claims. (Cl. 137—636.2)

ABSTRACT OF THE DISCLOSURE

This invention relates to an improved control mechanism employing a single actuator designed to operate a plurality of control devices selectively and/or simultaneously through a plurality of motions imparted to the single actuator. In the disclosure, the control devices are fluid pressure control valves which are positioned in a manifold in a side-by-side relationship and the control mechanism is comprised of a pedestal type support with a universal bearing mounting a housing for a control handle. The housing has connected thereto three separate linkage systems whose pivotal axes are aligned with the various input axes to the control housing from the handle through the universal pivot. The arrangement of parts permit selective actuation of the respective control devices or simultaneous actuation of all of the devices with varying input movements applied to the control handle. The single handle type control mechanism has a universal pivotal mounting of the same and the respective linkage systems to the control devices align the pivoted axes of such linkage with the pivotal mounting systems to provide an overall simplified structure which permits the selective and simultaneous operation of the control devices and a positioning of the control devices in a manifold in a predetermined relationship with the control handle and pedestal mounting.

---

This invention relates to control mechanisms for operating a plurality of control devices and more particularly to an improved single actuator operable through a plurality of directions of input motions for selectively and independently controlling plural fluid pressure control valves.

Control units of this general type have application in connection with apparatus designed to move objects in various directions. For example, such control units are utilized in connection with power operated shovels, booms, cranes and modification of such equipment for supporting personnel. To simplify the operation of such apparatus, the use of individual controls for operating the separate motors therein has given way to the use of a single actuator type control mechanism. This is particularly true in the variety of personnel supporting booms where the operator is positioned in a supporting carriage at the end of the boom. The single actuator type control mechanism is designed for a plurality of input movements to correspond with the desired and ultimate control movement of the working portion of the apparatus through selective operation of the motive means thereon. Thus in the case of power operated and personnel supporting booms, a single actuator of this type is designed for controlling vertical, transverse and rotary movement of the entire apparatus and the direction of displacement of the single actuator in its controlling function will correspond to the movement of the working portion of the apparatus.

In prior control mechanisms of this type, the single actuator control mechanism designs have been generally complex in structure, expensive to manufacture, difficult to correlate with desired ultimate movement of the apparatus, and difficult to operate in such a manner that only a single motive means will respond over an entire range of movement of the single actuator in a control direction. In this sense, the prior devices of this type have been unable to isolate desired control movements to effectively operate the control apparatus through individual motors in a desired control direction.

The improved control mechanism of the single actuator type permits independent control movements to the fluid pressure control devices or valves for selective and independent operation of motive means associated therewith to provide for more accurate and smooth ultimate control apparatus of this type. Further, the improved single actuator control mechanism is simple in design, rugged in construction and easy to use.

It is therefore the principle object of this invention to provide a control mechanism of the single actuator type which through its design and mounting provides improved operation selectively and independently of a plurality of fluid pressure controlled devices associated therewith.

Another object of this invention is to provide an apparatus of this type which is simple in design, and economical to manufacture and maintain.

A further object of this invention is to provide in an apparatus of this type a control mechanism in which the plural linkages and pivot connections from the single actuator to the plurality of separate control devices are aligned with the input movement axes of the control device in such a manner that any one or all of the control devices associated therewith may be simultaneously actuated.

These and other objects of this invention will become apparent from a reading of the attached description together with the drawings wherein:

FIGURE 1 is a plan view of the improved control mechanism,

FIGURE 2 is a side elevation view of the improved control mechanism of FIGURE 1, FIGURE 3 is a sectional view of the improved control mechanism of FIGURE 1, taken along the lines 3—3 therein, and FIGURE 4 is a sectional view of the improved control mechanism of FIGURE 1, taken along the lines 4—4 therein.

As will be seen in FIGURE 1, the improved control mechanism utilizing a single actuator is mounted on a common base 10 and includes a control device assembly indicated generally, at 12, which may be of the fluid pressure type. It will be recognized, however, that electrical control devices mounted on the common base in a side by side relationship may also be employed. In the present disclosure, the fluid pressure control devices are shown as a bank of valves mounted in a common valve body 15 having a plurality of input 20, return 22, and directional ports 24, 26 connected to the valve body which lead respectively to each of the valves for by-directional fluid pressure control. The fluid pressure control device is shown herein as an assembly of three valves each having an operating member 32, 34 and 36 respectively which move into and out of the valve body through rectilinear movement to control flow of fluid under pressure through the respective directional output ports 24, 26 from the supply port 20 and to the return ports 22. This common assembly is normally used in connection with power apparatus and located at the end of a personnel support boom to be operated by an operator positioned in the boom for control of a plurality of motors in the apparatus designed to directionally position the boom end for working purposes. Such apparatus is conventional with cherry pickers and other types of movable work platforms or carriages. The respective valves or control devices in the control device assembly 12 as evidenced by the operating members 32, 34, 36 and the plurality of input, return, and directional control ports 24, 26 are designed to control selectively and independently or simultaneously motive equipment in the operation of the power apparatus.

Associated with the plurality of control devices on the common support 10 is a single actuator control mechanism indicated generally at 40 which is mounted on the common support and connected to the respective operating members 32, 34 and 36 for operative input movements thereto.

The single actuator control mechanism is mounted on the common support 10 through a pedestal type bracket or member 42 suitably attached or fixed to the common support member 10 which is plate like in form through suitable means (not shown). The pedestal member 42 or upright member mounts a shaft 45 which extends through an aperture 46 in the upright member at the extremity of the same, the shaft which is reduced as at 47 and has a threaded extremity which fits through the aperture 46 in the upright member 42 and mounts a nut 48 to secure the same on the upright member. The shaft 45 extends normal or transversely to the upright member making a cantilever type support and the free extremity of the shaft 45 mounts a cylindrical bearing surface 49 which is suitably secured to the end of the shaft through means such as a pin 50.

Positioned over the spherical bearing surface or curved bearing surface 49 on the end of the shaft 45 is a generally cylindrical housing member 52 having an aperture or recess 54 in one side thereof in which is positioned a cooperating bearing surface 55 riding on and cooperates with the spherical surface 49 to provide a universal type pivot for the housing 52. The cooperating bearing surface or member 55 is suitably secured within the recess 54 of the housing through suitable means such as a flange 56 which is bent over the edge of the recess to retain the member 55 therein. Extending from one end of the cylindrical housing is a handle member or shaft 62 which fits into a recess 64 in this end of the cylindrical housing, the shaft being suitably secured therein by a pin 65.

Opposite the recess 54 is a second and smaller recess 70 which is aligned with and concentric with the cylindrical recess 54. Positioned in the recess 70 is a second shaft 72 having a spherical surface 74 on the extremity of the same, the spherical surface or member 74 being suitably mounted thereon through means, such as a pin 75. Within the recess 70 is positioned a cooperating spherical bearing member 76 which supports the bearing surface or member 74 within the recess 70 and is similarly secured therein through a turned over portion 78 in the edge of the housing. The bearing parts 74, 76 mount the shaft 72 concentric with the shaft 44 and displaced along the extent of this axes in a side by side relationship. The cylindrical member 54 has a shoulder portion 80 within which the recess 70 is positioned. The free extremity of the shaft 72 is further reduced as at 82 and a cylindrical collar portion 85 of a rod 87 is mounted thereon, the collar portion being secured thereby by a nut 88 which threads over a threaded extremity 89 of the rod 72.

Opposite the handle end of the housing 52 is a recess 90 in which is positioned a shaft 92 having a spherical bearing surface or member 94 thereon, and suitably attached thereto through means such as a pin 95. Cooperating with the spherical bearing member on shaft 94 is a spherical seat member 98 which is positioned in the recess 90 and serves to mount the spherical bearing member 94 with the shaft 92 thereon. The cooperating or seat member is secured within the recess by a flange portion 99. The geometric axis of the shaft 92 extends through the geometric center of the bearing member 49 on shaft 45 and is aligned with the axis of the rod or shaft 62 supporting the handle or forming the handle. The opposite extremity of 92 has a reduced portion 101 upon which is mounted a collar extremity 103 of a rod 105, the collar portion 102 being secured on the shaft 92 through a nut 106 and threaded on the threaded extremity 107 of the shaft 92.

As will be best seen in FIGURES 1 and 4, the shafts 72 and 92 journaled in the housing 52 on the pedestal support to which shaft 62 is attached are connected respectively to operating members 32 and 34 of the control device assembly 12. Thus it will be seen at the rod 87 which is attached to shaft 72 through the collar 85 extends to the operating member 32 where it is connected through a pivot pin 110 positioned in the substantially horizontal plane or in the plane of the support member 10 such that the rod 87 may be displaced in a vertical plane. Similarly the shaft 92 through a cooperating rod 112 by virtue of the connection of the collar 103 on the shaft 92 extends to the operating member 34 where it is connected through a pinned connection 115 positioned in a vertical plane such that the rod 112 may be moved in a plane substantially parallel to the support member 10. In addition to the above, the collar 103 includes a second flange 118 having a pin 119 therein which pin extends through a slot 121 in a lever assembly 120 generally L-shaped in form similar to a bell crank. The lever assembly 120 is pivotally mounted on the support member through a post 124 and suitably pinned thereon through a nut and bolt connection 125 to rotate in a plane parallel to the support member and on the same. One extremity 126 of the lever assembly or bell crank carries the slot 121 through which the pin 119 is positioned. The opposite extremity of the bell crank or lever indicated at 127 carries a pivoted connection 130 which supports a link member 132 connected to the operating member 36 of the third valve of the control device assembly. It also is connected at its free extremity through a pivoted connection 133 in the vertical plane which permits the link 132 and lever assembly 120 to move substantially parallel with the surface of the support member 10. The lever portion 127 also includes a bend as at 135 to clear the shaft 112 as it crosses the same.

As will be seen in phantom in FIGURE 1, the extremity of the shaft or handle member 62 mounts a handle grip member 140 by means of which the shaft 62 and hence the housing 52 to which it is connected is moved on the pedestal support or the transversely extending shaft 45 mounting the spherical mounting parts 49 and 55. This pivotal connection provides for substantially universal movement of the handle grip member or movement in three planes selectively and simultaneously on the spherical bearing parts. Thus the handle shaft 62 through the grip member 140 may be manually rotated about its own axis over a limited distance as a first direction of input movement. In addition, the shaft 62 may be rotated in a plane perpendicular to the axis of the shaft 45 and passing through the center of the spherical parts 49 and 55. This will be hereinafter described as for and aft movement. The third plane of movement of the shaft 62 through manually manipulation of the handle grip 140 is in a plane passing through the axis of the shafts 45 and 72 or from side to side and normal to the extent of the support member 10. It will be well recognized that the handle 62 may also be moved in any and all of these planes simultaneously. Thus the handle member 62 through the grips 140 may be moved rotatively, for and aft, and from side to side with respect to the pedestal support 42 and the support surface 10. The components of movement in each of these planes will effect rectilinear movement of the operating members 32, 34 and 36 of the control device assembly 12 or the individual valves therein. Rotative movement of the handle 62 will cause the shaft 72 mounted in the housing member 52 to be moved in an arcuate manner with respect to the geometric center of the housing member 52 or the spherical bearing parts 49 and 52. This movement will be applied to the linkage 87 which is pinned to the operative member 32 through the pin 110. Since the operative member 32, the pinned connection 110 and the lever 87 do not permit any rotative movement in this plane, the shaft 72 will move about the geometric center of the spherical bearing parts 49 and 55 to displace the operative member 32, in and out rectilinearly. Spherical bearing surfaces 76, 74 permit relative displacement of the shaft 72 with respect to the housing member 52 to provide this movement. With such movement, it will be noted that the housing member 52 is so rotated that the bearing parts 94, 98 of the shaft 92 will merely rotate on its geometric center and the rod 112 connected thereto as well as the bell crank or lever assembly 120 will not be effected by this movement. Thus as the handle 62 is rotated, only the control device evidenced by the operating member 32 will be effected and depending upon the direction of rotation, the operative member will be moved into and out of the valve body 15 of the valve assembly 12 to provide for directional flow through the respective ports 24, 26 to the associated motive device.

For and aft movement of the shaft 62 about the spherical bearing parts 49 and 55 will cause the rod 112 connected to the shaft 92 to be moved toward and away from the body assembly 15 of the control devices mounted on the support member 10. Inasmuch as the lever or rod 112 and its pinned connection 115 with the operative member 34 is solid and permits no rotative movement in the vertical plane, for and aft movement of the body or housing 52 on the pedestal support will provide for this in and out movement and directional control of the associated valve through the output ports 24, 26 associated therewith. With this in and out movement or movement in the vertical plane normal to the extent of the shaft 45 of the pedestal support, the shaft 72 will remain fixed in space as the housing 52 permits rotative movement between the flange portion 78 mounting the bearing part 76 with respect to the spherical bearing part 74 of the shaft 72. The in and out movement of the collar 103 does not effect displacement of the bell crank or lever assembly 120 inasmuch as the pin 119 on the flange portion 118 integral therewith is slidably displaced in the slot 121 positioned in the extremity of the lever portion 126 of the lever assembly 120. Thus the operation member 36 is not displaced by the for and aft movement of the handle 62.

The side to side movement of the handle 62 or movement in a vertical plane extending through the axes of the shafts 45 and 72 will effect only displacement of the operative member 36 through the bell crank or linkage assembly 120. Thus as the collar 103 is moved with movement of the shaft 62 in the side by side direction through movement of the housing member 52 on the spherical bearing parts 49 and 55, the shaft 92 will displace the lever portion 126 about the upstanding pivot 124 to cause the opposite extremity or lever portion 127 of the lever assembly 120 to move through the linkage 132 toward and away from the valve body 15 and hence to provide rectilinear movement of the operating member 36. The pivoted connections 133 and 130 permit this in and out movement with clockwise and counter-clockwise displacement of the lever assembly 120 and its pivot pin 124. This side to side movement does not, however, effect operation of the operating member 34 through the linkage 112 inasmuch as this linkage is displaced about its pivot 115 as the shaft 92 is moved on its bearing parts 94, 98 to compensate for this movement. Similarly, the side by side movement of the housing member 52 will cause the shaft 72 to rotate within its bearing structures 74, 76 and the lever 87 to pivot on the pivot support 110 connected to the collar 85 on the shaft 72 to compensate for this movement such that the operating member 32 is not displaced. Thus with side to side movement of the handle 62, only the control device or valve evidenced by the operating member 36 will be effected and operated.

It will be well recognized that displacement of the handle which involves components of movement in all three planes will effect simultaneous movement of all of the lever assemblies herebefore identified and operation of the valves associated therewith in proportion to the degree of displacement. Thus the associated control device may be operated from a single handle assembly 40 to selectively operate each of the valves by rotating the handle in varying directions or in varying planes with reference to the universal mounting of the handle on the pedestal support. Similarly, if it is desired to effect movement or operation of all three motors associated with the control device assembly 12, the handle may be so displaced with reference to the pedestal support as to effect movement in each of these planes and hence operation of the respective motive means connected to the control devices effected thereby. Thus the single handle actuator assembly may provide for simultaneous operation of the plurality of control devices, which are shown herein as fluid pressure type valves but may take the form of other type control devices, on a common support and operated through a rectilinear movement of an input member.

The improved control mechanism of the single actuator type provides a simplified structure and a simplified mounting through a universal type pivot to facilitate mounting of the actuator on a common support with the control devices to be operated thereby. The use of universal pivots aligned with the geometric axes and normal thereto and with the center of the universal pivot supporting the operating handle permits an arrangement of parts by means of which certain components of movement may be isolated with respect to a desired input movement to give only the desired operation of an associated control device. Thus the simplified mounting through the use of spherical bearings and inner-connecting linkages permits the handle member to be displaced in any one of the number of planes and with such displacement to effect operation selectively of only one control device associated therewith. This simplified structure is simple to manufacture, reduced in cost and easy to maintain.

Therefore in considering this invention it should be remembered that the present disclosure is intended to be illustrative only and that variations in form of the linkages and the connecting parts may be effected. Therefore we wish to be limited only by the appended claims.

What is claimed is:

1. In a control mechanism adapted to control a plurality of control devices mounted on a common base member and each control device having an operating member movable rectilinearly to control the operation of the control devices comprising, a pedestal support adapted to be mounted on the common base member, said pedestal support including a first universal pivot means at one extremity thereof, a hollow actuator body mounted on the first universal pivot means and including an upstanding handle for movement of the body on the first pivot means of the pedestal support in a plurality of directions to selectively and simultaneously effect the operation of the plurality of control devices, a second universal pivot means mounted in part on said hollow body and aligned at its geometric axis with the geometric axis of the first universal pivot means and including a connecting linkage connecting the operating member of one of said control devices to said hollow body through said second pivot means, a third universal pivot means included in part in the hollow body and having its geometric axis positioned normal to the geometric axis of the first universal pivot means and passing through the geometric center of the first universal pivot means, said third pivot means including a connecting linkage connecting the operating member of the second of said control devices to said hollow body through said third pivot means, an additional connecting means including a lost motion connection and a bell crank lever means connecting the third of the operating members of the third of said control devices and said hollow body, each of said connecting linkages of said second and third pivot means and said additional connecting means being operable to move the operating members of said control devices rectilinearly with movement of said hollow body through movement of the control handle in the plurality of directions.

2. The control mechanism of claim 1 in which the first universal pivot means is a spherical bearing.

3. The control mechanism of claim 2 in which the second and third universal pivot means are spherical bearings.

4. In a control mechanism adapted to control a plurality of control devices mounted on a common base member and each having an operating member movable rectilinearly to control the operation of the control devices comprising, a pedestal support adapted to be mounted on the common base member, said pedestal support including a first pivot means at one extremity thereof, a hollow actuator body mounted on the first pivot means and including an upstanding handle for movement of the body on the first pivot means on the pedestal support in a plurality of directions to selectively and simultaneously effect the operation of the plurality of control devices, a second pivot means mounted in part on said hollow body and aligned at its geometric axis with the geometric axis of the first pivot means and including a connecting linkage connecting the operating member of one of said control devices to said hollow body through said second pivot means, a third pivot means included in part in the hollow body and having its geometric axes positioned normal to the geometric axis of the first pivot means and passing through the geometric center of the first pivot means, said third pivot means including a connecting linkage connecting the operating member of a second of said control devices to said hollow body through said third pivot means, an additional connecting means including a lost motion connection and a bell crank lever means connecting the third of the operating members to the third of said control devices and said hollow body, each of said connecting linkages of said second and third pivot means and said additional connecting means connecting the operating members of said control devices to the hollow body being operable to move the operating members rectilinearly with movement of the handle and the hollow body connected thereto in a plurality of axis of movement normal to one another.

5. In a control mechanism adapted to control a plurality of control devices mounted on a common base member and each having an operating member movable rectilinearly to control the operation of the control devices comprising, a pedestal support adapted to be mounted on the common base member, said pedestal support including a first universal pivot means at one extremity thereof, a hollow actuator body mounted on the first universal pivot means and including an upstanding handle for movement of the body on the first pivot means on the pedestal support in a plurality of directions to selectively and simultaneously effect the operation of the plurality of control devices, a second universal pivot means mounted in part on said hollow body and aligned at its geometric axis with the geometric axis of the first universal pivot means and including a connecting linkage connecting the operating member of one of said control devices to said hollow body through said second pivot means, third universal pivot means included in part in the hollow body and having its geometric axis positioned normal to the geometric center of the first pivot means, said third pivot means including a connecting linkage connecting the operating member of the second of said control devices to said hollow body and third pivot means, said handle being operative when moved to displace the hollow body on the first universal pivot about a pair of axes which movement is transmitted through said second and third universal pivot means and their respective connecting linkages to selectively and simultaneously operate the plurality of control devices.

6. The control mechanism of claim 5 in which the first, second, and third universal pivot means are spherical bearings.

7. A control mechanism adapted to be connected to and mount a plurality of control devices which are positioned on a common support and have operating members movable rectilinearly within the control devices for operation thereof, comprising, a cantilever type support mounted on the common support and including a single bearing member, a cooperating bearing structure mounted on and surrounding the bearing member and including an upstanding handle to permit the movement of the handle in three directions of movement, a first universal bearing means positioned on one side of said cooperating bearing structure and having its principle axis of movement aligned with a first of the axes of movement of the cooperating bearing structure on the single bearing member, a second universal pivot means mounted on the cooperating bearing structure remote from said first unialigned with a first of the axes of movement of the cooperating bearing structure on the single bearing member passing through the center of the single bearing member and aligned with a second of the axes of movement of the cooperating bearing structure on the single bearing member, and an additional connecting means connected to said cooperating bearing structure and including means for transmitting the motion of the handle about a third axis of movement and connected to a third of said control devices for operating the same.

8. A control mechanism for manual operation of a plural valve comprising, a valve body mounted on a base member and including a plurality of valve members each having an operating member movable rectilinearly with respect to the valve body and parallel to the remaining operating members to control the operation of the respective valves, a pedestal type support mounted on the base member adjacent the valve body, pivot means at the free extremity of the pedestal support, a manual control lever including a housing therefore mounted on the pivot means for movement about a plurality of pivot axes and including first and second pivot members aligned respectively with two of the pivot axes of the control handle on the pedestal support, first and second linkage means pivotally connecting the operating members of two of said valves in the valve body with the body of the control handle through the first and second pivot members for operation through movement of the handle on the pedestal support about said two of the axes of pivot, and a third linkage connected to one of the first and second pivot members and including motion translation means, said third linkage being connected to the operating member of a third of said valves in the valve body for operation with movement of the control handle on the pedestal support about a third axes of pivot.

9. The control mechanism of claim 8 in which the pivot means on the pedestal support and the first and second pivot members include spherical bearings.

10. The control mechanism of claim 9 in which the motion translation means is a bell crank pivotally mounted on the common support.

11. The control mechanism of claim 10 in which the first and second pivot members are included in the housing of the manual control lever with the axes of movement of the first and second pivot members being respectively aligned with the axes of movement of the pivot means on the pedestal support mounting the housing of the manual control lever, and in which the pivot axes of the first and second pivot members intersect at the geometric center of the pivot means of the pedestal support.

12. The control mechanism of claim 11 in which the third linkage includes a lost motion connection.

References Cited

UNITED STATES PATENTS 3,131,574   5/1964   Clingerman _____ 137—636 X

STANLEY N. GILREATH, *Primary Examiner.*

UNITED STATES PATENT OFFICE

CERTIFICATE OF CORRECTION

Patent No. 3,338,269                            August 29, 1967

Ralph E. Carbert et al.

It is hereby certified that error appears in the above numbered patent requiring correction and that the said Letters Patent should read as corrected below.

Column 8, line 39, for "aligned with a first of the axes of movement of the co-" read -- versal bearing means and with an axis of movement --.

Signed and sealed this 24th day of September 1968.

(SEAL)
Attest:

Edward M. Fletcher, Jr.                        EDWARD J. BRENNER
Attesting Officer                               Commissioner of Patents